Aug. 2, 1949.  C. A. YOUNG  2,477,680
GLARE SHIELD
Filed April 19, 1947
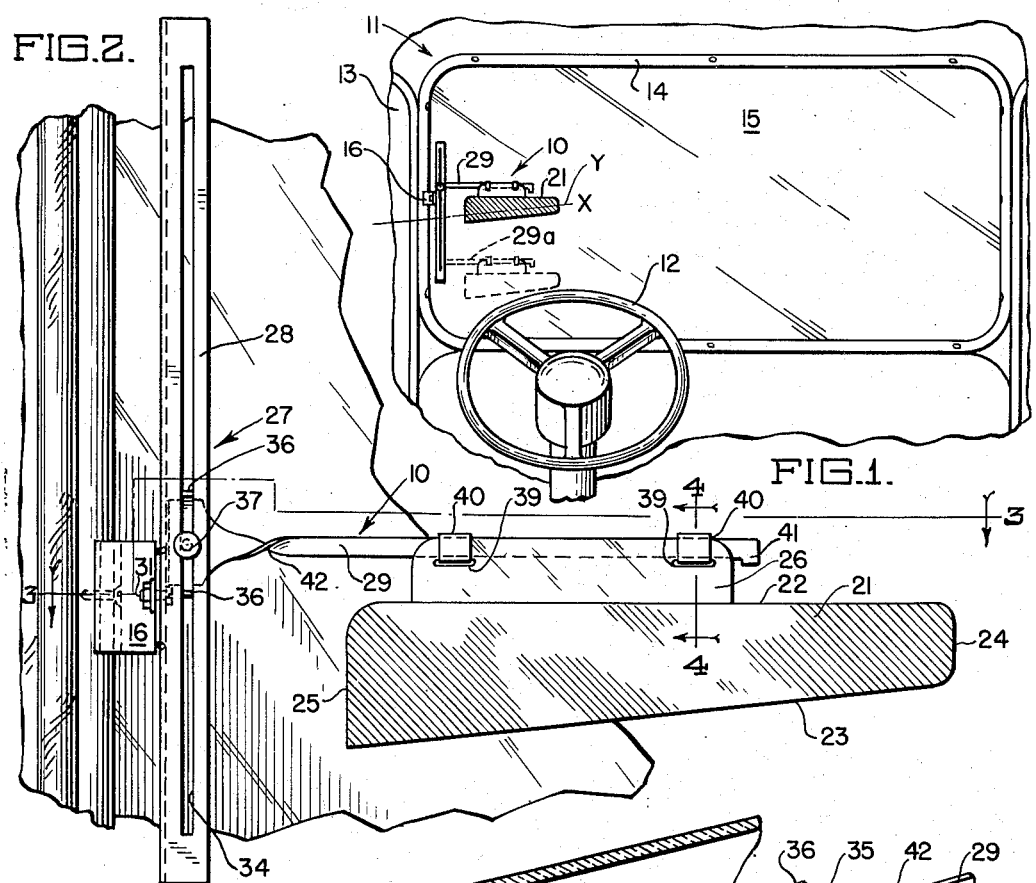
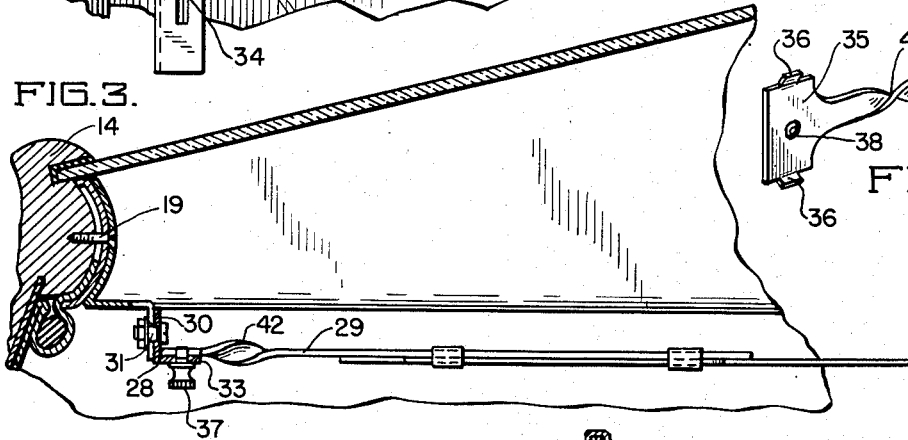
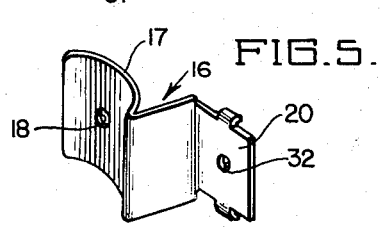
Inventor
Claude A. Young
By Zabel & Gritzbaugh
Attorneys Patented Aug. 2, 1949

2,477,680

UNITED STATES PATENT OFFICE 2,477,680

GLARE SHIELD

Claude A. Young, Chicago, Ill.

Application April 19, 1947, Serial No. 742,525

2 Claims. (Cl. 296—97)

1

The present invention relates to a glare shield useful for night driving of automobiles for reducing to a minimum the glare of headlights from approaching automobiles. Heretofore conventional glare shields have been of the type where the automobile driver was required to place the shield directly in his line of vision so that when the shield was in use the driver's normal line of vision passed directly through the shield. Thus while such shields have been effective in reducing headlight glare, they also have been effective in reducing visibility at night when maximum visibility is essential to safe driving.

The glare shield forming the subject matter of the present invention is effective in reducing headlight glare from approaching automobiles at a time when this glare is most intense and bothersome to the driver. This is accomplished without any reduction in visibility in the normal line of vision since the driver is not required to look through the shield to see the road ahead of him. Thus the invention provides a glare shield that serves to reduce headlight glare but does not materially interfere with the visibility of the driver.

The present glare shield is small and is readily adjustable to fit the needs of any driver. This adjustment can be accomplished with one hand so that the driver may make the necessary adjustments quickly, while at the same time having one hand free to drive the car. Provisions are made for allowing the glare shield to be moved to an out-of-the-way position when it is not in use.

The foregoing constitute some of the principal objects and advantages of the present invention, others of which will become apparent from the description which follows and the drawings, in which Fig. 1 is a more or less diagrammatic view of the glare shield forming the subject matter of the present invention mounted in place adjacent to the windshield in front of the driver's position;

Fig. 2 is an enlarged fragmentary elevational view illustrating the glare shield mounted in place adjacent to the windshield;

Fig. 3 is a transverse sectional view shown partially in elevation of the glare shield and support, the view being taken on the line 3—3 of Fig. 2;

Fig. 4 is an enlarged, vertical sectional view through a portion of the glare shield, the view being taken on the line 4—4 of Fig. 2;

Fig. 5 is a perspective view illustrating the

2 bracket that is used in fastening the glare shield to the side of the windshield; and Fig. 6 is a fragmentary perspective view illustrating a portion of the horizontal arm upon which the glare shield is mounted.

For purposes of illustration a specific embodiment of the invention has been selected and will be described hereinafter, it being recognized that modifications may be made without departing from the intended scope of the invention.

Referring now to the drawings the glare shield forming the subject matter of the present invention is generally indicated at 10 in Fig. 1 and is illustrated in connection with a windshield 11 of an automobile. The driver's wheel 12 in this instance is mounted on the left hand side of the car, the left hand side or wall of the car being illustrated at 13. The windshield 11 provides a frame 14 in which is mounted the windshield glass 15. As shown the glare shield 10 is attached to the frame 14 of the windshield 11 by means of an attaching bracket 16 best shown in Figs. 3 and 5 that comprises a frame engaging portion 17 that is apertured at 18 to receive a screw 19. This screw 19 fixes the bracket 16 to the frame 14 of the windshield. The bracket 16 is further provided with a glare shield supporting arm 20.

The glare shield 10 comprises a sheet of translucent material 21 which as shown has an upper edge 22 that is disposed substantially horizontal when mounted for use in the automobile. The shield is further provided with a lower edge 23 that slopes downwardly from right to left so that the right hand edge 24 of the glare shield is relatively narrow, whereas the left hand edge 25 is relatively wider. Extending upwardly from the upper edge 22 of the translucent sheet 21 is a sheet attaching portion 26 that is preferably transparent and colorless. This sheet attaching portion 26 is preferably shorter in length than the overall length of the translucent sheet 21 so as to reduce to a minimum the obstruction to vision above the sheet 21.

The attaching device generally indicated at 27 in Fig. 2 is provided for the translucent sheet 21 and comprises a substantially vertical post 28 and a horizontal arm 29. The post 28 as shown is an angle member having one flange 30 provided with a vertical slot to receive a bolt 31 that passes through an aperture 32 in the supporting arm 20 of the bracket 16. The other flange 33 of the post 28 is vertically slotted at 34 as best shown in Fig. 2. The horizontal arm 29 is provided at one end thereof with an attaching face 35 having a pair of ears 36 projecting therefrom. When the arm 29 is mounted on the vertical post 28 these ears 36 are disposed in the vertical slot 34 and a thumb screw 37 is threaded into a threaded aperture 38 (see Fig. 6) in the attaching face 35. Thus the arm 29 is slidable up and down on the post 28, the ears 36 being adapted to slide in the slot 34. The thumb screw 37 is loosened during this movement of the arm and is then tightened to lock the arm in any selected position. When the glare shield is not in use the thumb screw 37 is loosened and the arm 29 is moved to its lowermost position illustrated by the broken lines 29a in Fig. 1. The glare shield is then out of the way since the normal line of vision for the driver is considerably above this broken line position 29a.

The sheet attaching portion 25 of the translucent sheet 21 is provided with a pair of spaced apertures 39 for receiving attaching brackets 40 that are slidably fastened to the arm 29. Thus the translucent sheet 21 is slidably horizontal along the arm 29, there being provided at the free end of the arm 29 a stop 41 that limits the outward movement of the translucent sheet 21.

Thus there is provided a translucent sheet 21 that is both vertically and horizontally adjustable with respect to the driver's position behind the wheel 12. Some drivers sit directly behind the wheel as they are driving their automobile, whereas others may assume a position against the left hand wall 13 of the automobile. The translucent sheet 21 being movable horizontally along the arm 29 can be adjusted to the proper location to fit the needs of either driver. Similarly, vertical adjustment of the translucent sheet 21 is provided along the post 28 to suit the needs of both tall and short drivers.

The arm 29 is provided with a twist 42 which furnishes vertical transverse adjusting means for the arm 29 so that the arm can be bent generally upwardly or downwardly about the twist 42. Thus this is important because the angularity and pitch of windshields varies in the different makes of cars and it is desirable that the translucent sheet 21, when in position for use on the automobile, be disposed vertically and at right angles to the normal line of vision of the automobile driver. This vertical condition of the translucent sheet 21 is made possible by adjusting the amount of twist in the arm 29 which can be accomplished with a pair of pliers after the glare shield is installed in a particular automobile.

Referring now to Fig. 1 let it be assumed that the normal line of vision for a particular driver is more or less in alignment with the center of the driver's wheel 12 and for purpose of illustration this line of vision through the windshield 11 is marked with the letter "X". For such a driver the glare shield 10 is quickly adjusted to the height and lateral position illustrated so that the translucent sheet 21 is disposed to the left of this normal line of vision indicated by the letter "X". Under these conditions the driver at no time is actually required to look through the translucent sheet 21 while viewing his portion of the road. Thus his normal line of vision is in no way impaired by the presence of the glare shield 10. This is extremely important because at night time any glare shield, no matter how lightly tinted the translucent portion may be, reduces the amount of light passing through the shield. Thus where the driver is normally required to view the road through the glare shield his vision is obstructed and this condition is very dangerous, particularly at night time.

Again referring to Fig. 1, let it be assumed that an automobile is approching the present driver at night time where headlights are turned on. When these headlights first come in view and the car is at a considerable distance away, there is not sufficient brilliance or glare to interfere with the present driver's vision and consequently the fact that these lights first appear at the position marked with the letter "X" on the windshield 11 is of no consequence. As the two cars approach each other the movement of the headlights of the approaching car across the windshield 11 follows the path indicated by the broken lines "Y" in Fig. 1 and it is not until the brilliance and glare of these approaching headlights reach a brilliance that will interfere with the driver's vision that these headlights move behind the translucent sheet 21 of the glare shield 10. During the remainder of the time when the two cars are passing each other the path of the headlights of the approaching car follows line "Y" throughout the full length of the translucent sheet 21 of the glare shield 10 and it is not until the two cars are just about ready to pass that the path of the headlights of the approaching car pass beyond the left hand end of the translucent sheet 21 of the glare shield 10. In this latter position however the direction of the glare from the approaching headlights is behind the driver of the present automobile so that this glare in no way interferes with the vision of the present driver.

It is to be noted that the lower edge 23 of the translucent sheet 21 is substantially parallel with the path of the headlights of approaching automobiles indicated by line "Y" so that the path of these headlights across the translucent sheet 21 is substantially parallel to this bottom edge 23.

The glare shield just described is very easily adjustable so that if a driver is moving along a country road where there is practically no traffic and the glare shield is in the position indicated in broken lines in Fig. 1 the shield can be quickly raised to operative position, if the need should arise, by a simple twist of the thumb screw 37 followed by an upward pushing force to raise the shield to its solid line position shown in Fig. 1. Final horizontal position of the translucent sheet 21 is accomplished by merely grasping the translucent sheet and merely sliding the same to the right or left along the arm 29. The attaching brackets 40 are spring members that create sufficient friction against the arm 29 to hold the sheet 21 in any adjusted position so as to prevent movement due to car vibration.

The bracket 16 is adjustable longitudinally along the post 28 so that the attaching device 27 is adaptable to any make of automobile.

The sheet 21 has been referred to as a translucent sheet. For purposes herein this shall be construed to mean a transparent sheet that is colored or otherwise treated to reduce light transmission therethrough so as to minimize glare without materially limiting the ability to view objects through the sheet. Though the upper edge 22 of the sheet 21 is shown straight or substantially horizontal, it may slope from right to left, thereby further reducing its size.

Throughout this description the expression "glare is reduced to a minimum" means that glare is filtered out and reduced in intensity so that it no longer interferes with the normal vision of the driver.

I claim:

1. A glare shield of the class described comprising a sheet of translucent material having a lower sloping edge, and mounting means for the sheet comprising a substantially vertical member disposed adjacent to the side of the sheet having the lowermost edge, a substantially horizontal arm mounted for sliding movement vertically along the member, and attaching means for fastening the sheet for horizontal sliding movement along the arm.

2. A glare shield of the class described comprising a sheet of translucent material having a lower sloping edge, and mounting means for the sheet comprising a substantially vertical member disposed adjacent to the side of the sheet having the lowermost edge, a substantially horizontal arm mounted for sliding movement vertically along the member, and attaching means for fastening the sheet for horizontal sliding movement along the arm, the area between the sheet and the arm providing substantially unobstructed vision through the windshield.

CLAUDE A. YOUNG.

REFERENCES CITED

The following references are of record in the file of this patent:

UNITED STATES PATENTS

| Number | Name | Date |
| --- | --- | --- |
| 1,483,640 | Manning | Feb. 12, 1924 |
| 1,941,032 | Knowles | Dec. 26, 1933 |
| 1,969,887 | Flanary | Aug. 14, 1934 |